G. H. PALTRIDGE.
OBTAINING DRY SOLIDS FROM LIQUID SUBSTANCES.
APPLICATION FILED JAN. 23, 1909.
1,051,441.
Patented Jan. 28, 1913.
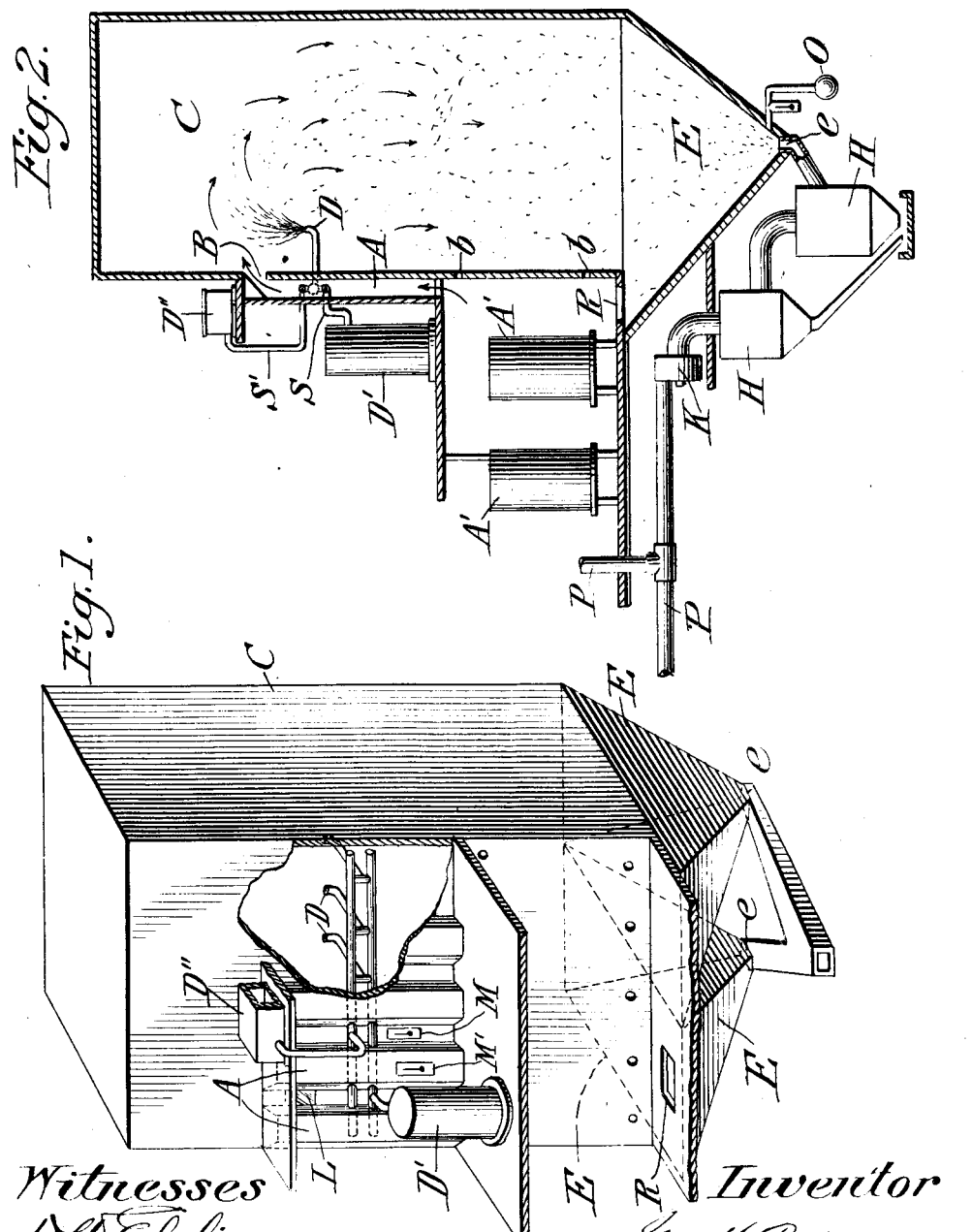

UNITED STATES PATENT OFFICE.

GEORGE H. PALTRIDGE, OF WASHINGTON, DISTRICT OF COLUMBIA.

OBTAINING DRY SOLIDS FROM LIQUID SUBSTANCES.

1,051,441.　　　　　Specification of Letters Patent.　　Patented Jan. 28, 1913.

Application filed January 23, 1909. Serial No. 473,896.

*To all whom it may concern:*

Be it known that I, GEORGE H. PALTRIDGE, citizen of the United States, residing at Washington, in the District of Columbia, have invented certain new and useful Improvements in Obtaining Dry Solids from Liquid Substances, of which the following is a specification.

This invention relates to the drying of liquids, semiliquids, liquid emulsions, juices, syrups and like substances in a manner to obtain the solid constituents of any substance of such nature in a commercially dry form, and relates to the conserving and disposing of these solid constituents and the vapors and gases which occur in the drying process in such a way as to thoroughly separate the solid from the vapor constituents, and at the same time, to retain the solid constituents in a dry and homogeneous condition without waste of material.

This invention has for its object to produce a process for conserving, disposing, retaining and recovering the constituents of such substances as are set forth in the foregoing and for recovering the constituents in such form as set forth therein, and it has for its object the manufacture of a dry product of milk, a dry product of cream, a dry product of eggs, and combinations of these, which are uniform in quality, structure and grain, which do not readily pack down and cake when left for some time in receptacles and which are easily dissolved and emulsified in water.

For the initial step toward separating the solid constituents from moisture, this invention employs the known method of spraying the liquid, or liquid-like substance, to be dried into an air chamber by means of vaporizing devices, preferably those actuated by compressed air. The special features of the process herein disclosed consist in conducting the entire vapor and solid contents of the chamber in the same general direction within the chamber and downward in the normal direction of precipitation of the solids, and consist also in discharging all these vapor and solid contents from the chamber, or chambers, continuously, together, in a like percentage of mixture at all points of discharge and through the same and commonly serving exit ports into separating apparatus. Other processes aim to discharge the vapor from the air chamber at a point or points separate from the principal point of discharge or collection of the solid constituents. But since precipitation of the solid constituents cannot be complete in the presence of an exhaust draft which is maintained in another direction to carry away vapor, part of the precipitate or solid particles is carried along with the vapor and moreover, a large percentage of the particles thus carried consists of the lighter solids of the substance being dried. This carried precipitate must then be collected from the vapor by a means of dust arresters, or collectors, and mechanically mixed back with the main precipitate. Thus the product obtained is not thoroughly homogeneous and the finer precipitates not so easily or so completely extracted as by the present process, according to which all the precipitate is carried together, the weight of the heavier solids aiding the precipitation of the lighter solids with them. The entire precipitate is slightly moist during the operation of the separator because of the presence of vapor and settles more readily and completely than by the methods which attempt to carry off the vapor at a different point in the air chamber or in a different direction from that in which precipitation normally occurs. Furthermore, when, as by former processes, precipitate is allowed to settle in a heated air chamber, or chambers, it is subjected to the heat of whatever material forms the lining or interior finish of the air chamber, or hopper, and some of the product becomes cooked, or caramelized thereby. And again, the air condition of the chamber to which the settled precipitate is also exposed may become supersaturated by reason of atmospheric change, back pressure on the vapor exhaust, over-atomization, etc., which makes the product lumpy and, in extreme cases, worthless dough. These difficulties are serious as sources of loss, as hindrances to smooth operation and as preventing a high and uniform grade of product. In view of such considerations as these, I have devised a method of operation which obviates many difficulties attendant upon vaporizing processes heretofore employed for the purpose of obtaining dry solids from liquids, particularly for obtaining the dry solids of milk, and the dry solids of eggs, and which produces a uniform and homogeneous product of either or both which is readily soluble in water for all constituents which were in solution in the original substance and emulsifiable in water for all constituents which were held in suspension in the original substance.

In the accompanying drawing, wherein I have illustrated one form of apparatus suitable for carrying out the improved process, Figure 1 is a perspective view of the apparatus, with parts broken away, and the separating mechanism removed, and Fig. 2 is a vertical transverse section of the apparatus.

Referring to the drawing, the apparatus is shown as embodying air ducts A leading from systems of coils, A', through which an air supply is drawn and conditioned to the temperature required. A plurality of major duct outlets, B, and a plurality of minor duct outlets, $b$, admit the conditioned air into the air chamber C, which has insulated walls and ceiling and may be of varying dimensions governed by considerations of construction, capacity, and the substance for which it is to be used as a drying chamber. The duct outlets, as indicated here, are located for clearness of illustration. In operation, they would be located chiefly near the top of the air chamber in number and at points to secure, in conjunction with the flow of air produced by the exhaust, a free and even distribution of air supply throughout the chamber. They would also be provided in part with covers, or gates, to allow a variation in the supply for differences of air condition and exhaust.

D, D and D represent any number of atomizers actuated by compressed air from supply tank D', and supplied with the liquid substance being desiccated from supply tank D″. These atomizers are located at points in the upper part of the air chamber which will balance the distribution of vapors from them and throw the vapors into the paths of air supply from the major duct openings B, and are pointed in directions that will afford the discharged substance a maximum drop in the air chamber. The arrow heads within the chamber C indicate the general direction of flow of the vaporized air and precipitating solids to the exhaust points, *e*, in the hoppers E, of which exhaust points and hoppers there may be one or more to an air chamber depending principally upon the size and shape of the air chamber and the speed of exhaust. To preserve an even discharge of vapors as to planes in the chamber and a uniform condition of the product, there are preferably more than one point of exhaust located in practically the same plane and harnessed to a common collecting and separating chamber or device. The exhaust points, or ports, *e*, as shown in Fig. 2, are connected by conductors to H, H, which represent a collector and separator in operation with an exhaust fan, K. These may be of any type suitable for the materials handled and may be harnessed to the exhaust conductors of one or more chambers operated for the same product.

The letters, L, M, O and P indicate auxiliary features in the process. L, locates openings fitted with glass doors for observing conditions in the chamber and for handling the atomizers. M, and M′ locate thermometers which register the temperatures within the air chamber and air ducts, respectively. O indicates a hygrometer and a thermometer for indicating the humidity and temperature respectively of the exhaust, and P indicates pipe openings which may be opened or closed at will, and thereby give the exhaust passage to open air or to heating, cooling or other treatment, as desired. The conductors, S, and S′ from the compressed air and liquid supply tanks, respectively, are indicated as running outside the air supply ducts. If desired, either or both may be run inside one or more of the air ducts or for a distance in the air chamber to receive, prior to vaporization, the service of the heat, cold, or other condition of the air supply.

The operation of the system is apparent. Air currents from ducts A, which may be supplied with hot, cold, treated or untreated air, as the substance handled may require, flow across and into the path of diverging vapor from the atomizers and spread, mingle and drift downward carrying the vapors in suspension while the solid constituents of the vaporized substance fall in and with the flow of air and are drawn through the exhaust ports, which are common to and serve jointly for both vapors and solids, into the collector and separator where the solids are deposited after the manner of such devices and the vapors emitted into open air, or through a further conducting and treating system, as may be desired. The speed of exhaust can and should vary with the speed and condition of air required to yield the kind and quantity of product. For like reasons the atomizers, or other vaporizers, may be actuated by high or low pressures and, if of the type actuated by compressed air, the compressed air may be previously conditioned, treated, or untreated.

An important circumstance incidental to the method of the process herein disclosed arises from the fact that all of the natural gravity tendencies of the materials and agents involved in the process are in harmony with the very conditions which the manipulation of the process seeks to secure, namely; a distribution and thorough mingling of the air supply and vapor, a fall of all the solids and in the normal direction of precipitation, a full use of all the air supply to the chamber up to the definite degree of saturation desirable for the product sought, a discharge of the vaporized fluid into that condition of air which will most readily take up its vapor and offer least resistance to the discharge and therefore, most efficiently accomplish the initial change toward a dry product and derive a maximum benefit from the air while it is in the condition of highest drying efficiency and without losing any of the full efficiency of the air up to the operating limit of saturation. This is evident when one considers that moisture-laden air is heavier than air which has not received a like charge of moisture. As between moisture-laden and dry air then, the former will gravitate downward and the latter rise or preserve its higher position until it, in turn, becomes charged with moisture from the continuously vaporized substance and gravitates, giving place to the continuously fed supply of comparatively dry air. And since there is a continuous exhaust of air from the bottom of the chamber which is speeded with relation to the amount and rapidity of the continuous air supply and the degree of saturation desired and possible without condensation in the temperature maintained in the air chamber, the natural buoyancy of the air carries the vapors in suspension as they settle under the combined force of gravitation and means of exhaust. And since, by reason of these conditions, the highest degree of saturation existing in the chamber must be in its lower planes and approaching the exits, the registration of humidity at the exhaust determines the highest degree of saturation existing in any part of the chamber and affords an accurate index toward the use of all the air supply to its operating limit of saturation, or to that degree of saturation which, in combination with the force employed in vaporizing, will render a product of the structure and grain desired. And since again, the solids throughout their course in the chamber remain in an evaporating medium and are not allowed to settle until out of the chamber, separated from the vapor and out of contact with heated surfaces or other conditions that jeopardize the quality of the product, important advantages are evident:—The solids, being in a moisture evaporating medium, remain cooler than that medium by reason of the evaporation and thus, a comparatively high operating temperature and consequently a medium of high evaporative efficiency may be used and will render a product with the properties of the original substance well preserved and immediately freed from any entailed or subsequent conditions of operation which destroy or jeopardize its quality. This is particularly true of substances like milk, which, except in the presence of compensating conditions, such as just noted, must be operated under evaporative temperatures of low efficiency. In brief, the general advantages from the process herein disclosed are a conservation of material and power, the maximum capacity for a given installation, good control of manipulation and resulting product and a product of uniform quality not contaminated by minor conditions of operation.

My invention is not understood as being limited to the exact disposition of apparatus illustrated and described, nor to the use of a particular type of liquid spraying device, but it is intended to cover and include any operation in either an air or exhaust chamber and vaporizing process of drying liquid substances which secures the common distribution and downward flow and common exit through jointly serving outlet ports and conductors of all the vapors and solids of the substance being dried into a collecting and separating device or devices. It is also understood to cover and include any process of drying liquid substances which makes use of the principle of a common downward flow or conducting of all the chamber contents of either an air chamber or a substantially vacuum chamber to and through a common port or ports into a separating or collecting device or devices. For it is evident that by sealing all the air supply openings indicated in the accompanying drawings and providing heat, cold or other condition by means of a jacket to the chamber, or by coils suspended preferably at the ceiling and provided with drip troughs or conductors, the system may be operated as a substantially vacuum process of drying, the liquid substance being vaporized by atomizers, or by other vaporizers better adapted to preserving a vacuum.

Having thus described my invention, what I claim and desire to secure by Letters Patent, is:—

1. A process for drying liquid substances, which consists in supplying air to an air chamber, spraying atomized fluid into the upper part of the chamber and permitting it to drop downward while being dried by the air, and in discharging the entire air, vapor and solid contents of the chamber together at the same point in the bottom of the chamber.

2. A process for drying liquid substances, which consists in creating a downward draft of air in an air chamber, which draft is discharged through the bottom of the chamber, and in spraying atomized fluid into the draft or blast of air at such a point that the solid particles will drop with the body of air and vapor and be discharged from the chamber simultaneously with the latter and while mixed therewith.

3. A process for drying liquid substances, which consists in creating a downward draft of air in a suitable chamber and through an exit in or near the bottom thereof, in spraying atomized fluid into said draft of air and permitting it to drop freely down into the chamber and out through said exit while mixed and moving with the body of air, the vaporized fluid and air being carried throughout their entire course in the chamber in the normal direction of precipitation of the solids, and in separating the solids from the vapor as soon as the mixture is discharged from said chamber.

4. A process for drying liquid substances, which consists in creating in a suitable chamber a downward draft of air from a point near the top of the chamber and through the bottom of the latter, said draft of air being continuously discharged, and in spraying atomized fluid of the substance being dried into the air draft at a point above the bottom of the chamber and permitting the fluid particles to drop freely down in the air draft or blast and be discharged continuously from the chamber while being mixed and moving with the body of air, and separating the solids from the vapor contained in the mixture at a point outside of the air chamber.

5. A process for drying liquid substances, which consists in spraying atomized fluid into an air-supplied chamber, conducting the mixed air, vapor and substance downward within the chamber, continuously discharging the vapor and the solid constituents of the substance being dried, through the same exhaust ports and in a like condition of mixture at all of the ports, and in effecting a substantially complete separation of all the solids from the vapor, as a dried product, at a point outside of the air chamber.

6. A process for drying liquid substances, which consists in spraying atomized fluid into an air supplied chamber, conducting all vapors and substances present in the chamber and introduced by the process of spraying in a general downward direction, with and in the normal direction of precipitation of the solids, which are to be separated from them, and effecting a common discharge from the air chamber of all the vapors and solids at the same exhaust port or ports in a condition of mixture and in a like condition of mixture at all the ports.

In testimony whereof I affix my signature in presence of two witnesses.

GEORGE H. PALTRIDGE.

Witnesses:
 HOWARD B. CROSBY,
 EDITH C. FROST.